(12) United States Patent
Zhou et al.

(10) Patent No.: US 8,543,010 B2
(45) Date of Patent: Sep. 24, 2013

(54) BIAS CONTROL IN AN OPTICAL MODULATOR AND TRANSMITTER

(75) Inventors: Yuxin Zhou, Fremont, CA (US); Hock Gin Lim, Milpitas, CA (US)

(73) Assignee: JDS Uniphase Corporation, Milpitas, CA (US)

( * ) Notice: Subject to any disclaimer, the term of this patent is extended or adjusted under 35 U.S.C. 154(b) by 396 days.

(21) Appl. No.: 13/033,502

(22) Filed: Feb. 23, 2011

(65) Prior Publication Data

US 2011/0206384 A1  Aug. 25, 2011

Related U.S. Application Data

(60) Provisional application No. 61/307,741, filed on Feb. 24, 2010.

(51) Int. Cl.
*H04B 10/04* (2012.01)
*H04J 14/02* (2006.01)

(52) U.S. Cl.
USPC ............... 398/198; 398/93; 398/94; 398/197

(58) Field of Classification Search
USPC ...................... 398/93–94, 197–198
See application file for complete search history.

(56) References Cited

U.S. PATENT DOCUMENTS

| | | | |
|---|---|---|---|
| 5,003,624 A | 3/1991 | Terbrack et al. | 398/198 |
| 5,629,792 A | 5/1997 | Masaki | 359/245 |
| 6,198,854 B1 | 3/2001 | Takagi | 385/2 |
| 6,374,000 B1 | 4/2002 | Olesen | 385/2 |
| 7,023,534 B2 | 4/2006 | Lee et al. | 356/73.1 |
| 7,106,486 B1 | 9/2006 | Nahapetian et al. | 359/238 |
| 7,215,891 B1 | 5/2007 | Chiang et al. | 398/137 |
| 7,369,290 B1 | 5/2008 | Cox et al. | 359/239 |
| 7,394,992 B2 | 7/2008 | Kimmitt et al. | 398/185 |
| 7,555,226 B2 | 6/2009 | Tipper | 398/198 |
| 7,561,810 B2 | 7/2009 | Noguchi et al. | 398/198 |
| 7,633,988 B2 | 12/2009 | Fish et al. | 372/50.22 |
| 7,672,033 B2 | 3/2010 | Kobayashi et al. | 359/238 |
| 7,729,621 B2 | 6/2010 | Nahapetian et al. | 398/198 |
| 7,733,193 B2 | 6/2010 | Kershteyn et al. | 332/103 |
| 7,751,658 B2 * | 7/2010 | Welch et al. | 385/14 |
| 2009/0060528 A1 | 3/2009 | Takashima et al. | 398/186 |
| 2010/0119239 A1* | 5/2010 | Wang et al. | 398/198 |
| 2010/0271682 A1 | 10/2010 | Smith et al. | 359/239 |

OTHER PUBLICATIONS

"Fabrication and analysis of high-contrast InGaAsP-InP Mach-Zehnder Modulators for use at 1.55-μm wavelength" Fetterman et al. IEEE Photonics Technology Letters, vol. 8, No. 1, Jan. 1996 pp. 69-71.

* cited by examiner

*Primary Examiner* — Leslie Pascal
(74) *Attorney, Agent, or Firm* — Matthew A. Pequignot; Pequignot + Myers LLC (57) ABSTRACT

An apparatus and method for controlling bias in an optical modulator is disclosed. The method is particularly applicable to controlling multi-wavelength modulators and wavelength-tunable transmitters. At a calibration stage, a desired optical performance of the modulator is achieved, and an amplitude of a peak-to-peak variation of the output optical signal at a pre-determined amount of dither is stored in a memory as a reference. At operating stage, a controller of the optical modulator adjusts a bias voltage of the modulator until the measured peak-to-peak optical signal variation matches the reference value stored at the calibration stage. For multi-wavelength modulators and tunable transmitters, the calibration is repeated at each wavelength, and corresponding peak-to-peak optical signal variations are stored in the memory.

20 Claims, 6 Drawing Sheets

BIAS CONTROL IN AN OPTICAL MODULATOR AND TRANSMITTER

CROSS-REFERENCE TO RELATED APPLICATIONS

The present invention claims priority from U.S. Patent Application No. 61/307,741 filed Feb. 24, 2010 which is incorporated herein by reference for all purposes.

TECHNICAL FIELD

The present invention relates to optical modulators and transmitters, and in particular to controlling optical modulators and wavelength-tunable transmitters used in optical communications.

BACKGROUND OF THE INVENTION

Optical modulators are used in optical communication systems to modulate an optical signal with an electrical signal. The electrical signal can have a high frequency, for example a few gigahertz. The modulated optical signal is propagated over large distances in an optical fiber. At the receiver end, the signal is detected using a photodetector, and the electrical signal is restored for further processing or transmission.

Presently, wavelength-tunable transmitters find an increasing application in optical networking systems capable of providing bandwidth on demand. Wavelength-tunable transmitters are also used as "any-wavelength" backup transmitters in fixed-wavelength transmitter arrays. A tunable transmitter requires a multi-wavelength optical modulator, the optical performance of which does not vary with wavelength and does not change, or changes negligibly, as the tunable transmitter ages.

Every optical modulator has a transfer curve, which represents a relationship between an amplitude of electrical signal applied and a magnitude of optical modulation obtained at the output of the optical modulator. Performance of many optical modulators depends on a choice of a set point, that is, a point on the transfer curve corresponding to zero modulating electrical signal. The set point can be adjusted by adding a DC signal to the modulating electrical signal, or by segmenting the optical modulator and applying the DC signal to one of its segments.

Figure 1:
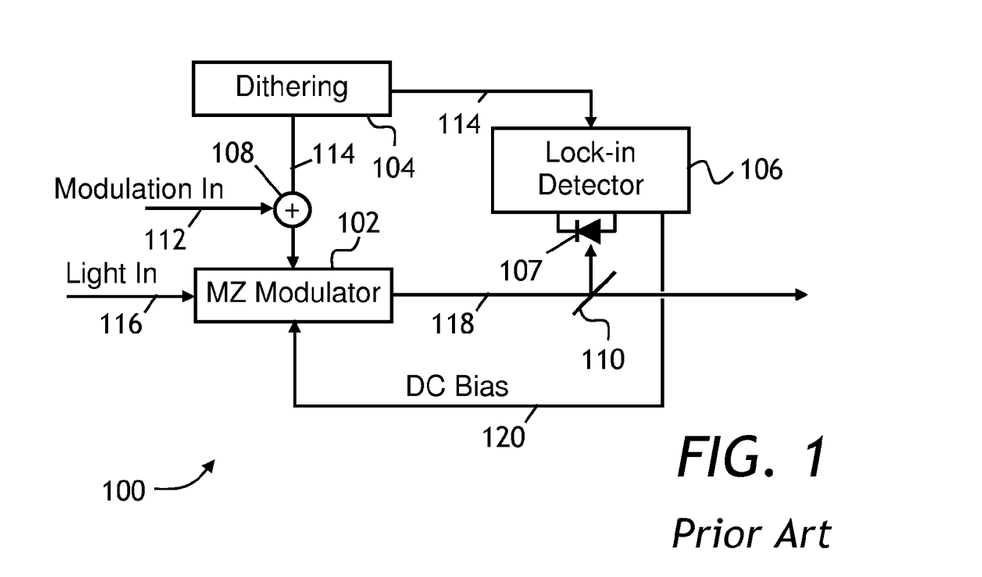
FIG. 1 is a block diagram of a prior-art stabilized modulator system.

The set point of an optical modulator has a tendency to drift with temperature. To reduce thermal drift, a dither voltage is added to the modulating voltage, and a synchronous (lock-in) detection is employed to stabilize the set point. Referring to FIG. 1, a typical stabilized modulator system 100 is presented. The system 100 includes a Mach-Zehnder (MZ) optical modulator 102, a dithering unit 104, a lock-in detector 106 having a photodetector 107, a mixer 108 for mixing modulation and dithering signals 112 and 114, respectively, and a beamsplitter 110. In operation, an optical signal 116 is applied to the MZ optical modulator 102. The optical signal 116 is modulated with the modulation signal 112 applied to the MZ optical modulator 102 through the mixer 108. The dithering unit 104 generates the dithering signal 114, which is mixed by the mixer 108 into the modulation signal. A small fraction of an output optical signal 118 is directed by the beamsplitter 110 to the photodetector 107. The lock-in detector 106 generates a DC bias signal 120 based on a synchronously detected component of the output optical signal 118 at the frequency of the dithering signal 114.

Various modifications and adaptations of the stabilized modulator system 100 have been disclosed. By way of example, Tipper in U.S. Pat. No. 7,555,226 discloses an automatic bias controller for a MZ optical modulator. The automated bias controller of Tipper uses a microprocessor for both dithering and processing of the modulated optical signal. An optical power detector is used for detecting optical power of light emitted by one of two output arms of the MZ modulator. The detected signal is analyzed, and a bias voltage is adjusted so as to stabilize the set point of the MZ modulator. The other output arm of the MZ modulator is used to output the modulated optical signal.

Nahapetian et al. in U.S. Pat. No. 7,729,621 disclose a controller of a bias voltage for a MZ modulator, programmed to receive a dither signal, determine a derivative and/or an integral of the dither signal, and control a bias voltage for the MZ modulator based on the derivative and/or the integral of the dither signal.

Noguchi et al. in U.S. Pat. No. 7,561,810 disclose a bias controller of an optical modulator, wherein a pilot tone is added to the biasing voltage of the optical modulator. A monitor signal is branched into a signal path and a noise path. A notch filter is used in the noise path to suppress the pilot tone. The signals in both paths are synchronously detected, and the synchronously detected noise is subtracted from the synchronously detected signal to improve the signal-to-noise ratio.

Optical modulator control systems of the prior art are not adapted to control a modulator operating at different wavelengths. Accordingly, it is an object of the present invention to provide a control system, a modulator, and a tunable transmitter usable therewith, that can maintain optimal optical performance at a plurality of wavelengths, over extended periods of time.

SUMMARY OF THE INVENTION

In accordance with the invention there is provided a method for controlling an optical modulator, comprising:
(a) applying a first optical signal, a first bias signal, and a first RF modulating signal to the optical modulator and measuring a performance parameter thereof, wherein a magnitude of the first bias signal is selected so as to obtain a pre-determined value of the measured performance parameter;
(b) while applying the first optical signal, the first RF modulating signal, and the first bias signal of the magnitude selected in step (a) to the optical modulator, applying a dither signal to the optical modulator and measuring a target peak-to-peak optical power variation of the first optical signal due to the dither signal application;
(c) storing a magnitude of the first bias signal and the measured target peak-to-peak optical power variation in a memory;
(d) upon completion of steps (a) to (c), applying a second optical signal, a second RF modulating signal, a second bias signal, and the dither signal to the optical modulator, and measuring an operational peak-to-peak optical power variation of the second optical signal due to the dither signal application; and
(e) adjusting the second bias signal, so as to lessen a difference between the operational peak-to-peak optical power variation measured in step (d) and the target peak-to-peak optical power variation stored in step (c), thereby obtaining the pre-determined value of the performance parameter without having to re-measure the performance parameter, wherein steps (a) to (c) are performed during calibration of the optical modulator, and steps (d) and (e) are performed during subsequent operation of the optical modulator.

In accordance with another aspect of the invention, there is further provided a control unit for controlling a multi-wavelength optical modulator, comprising:

a dither unit for applying a dither signal to the optical modulator;

a measuring unit for measuring a peak-to-peak optical power variation at an output of the optical modulator due to the dither signal application by the dither unit, when the optical signal is applied to an input of the optical modulator;

a memory for storing a target peak-to-peak optical power variation measured by the measuring unit for each of a plurality of wavelengths of an optical signal; and a feedback loop controller operationally coupled to the memory, the dither unit, and the measuring unit, for applying a bias signal to the optical modulator, in dependence upon a wavelength of the optical signal applied to the optical modulator input, so as to lessen a difference between the peak-to-peak optical power variation measured by the measuring unit and one of the target peak-to-peak optical power variations stored in the memory, corresponding to the wavelength of the optical signal applied.

In accordance with yet another aspect of the invention there is further provided a tunable transmitter comprising:

a tunable laser source for providing the optical signal;

a multi-wavelength optical modulator coupled to the tunable laser source;

the abovementioned control unit for controlling the multi-wavelength optical modulator; and a wavelength locker coupled to the control unit, for locking a wavelength of the tunable laser source to any of the plurality of wavelengths;

wherein the control unit is adapted to provide a wavelength control signal for tuning the wavelength of the tunable laser source to a first one of the plurality of wavelengths, using the wavelength locker to generate a wavelength error signal proportional to a deviation of the wavelength of the tunable laser source from the first wavelength, and to adjust a bias signal applied to the multi-wavelength optical modulator, so as to lessen a difference between the peak-to-peak optical power variation measured by the measuring unit and a target peak-to-peak optical power variation stored in the memory, corresponding to the first wavelength.

BRIEF DESCRIPTION OF THE DRAWINGS

Exemplary embodiments will now be described in conjunction with the drawings, in which.

DETAILED DESCRIPTION OF THE INVENTION

While the present teachings are described in conjunction with various embodiments and examples, it is not intended that the present teachings be limited to such embodiments. On the contrary, the present teachings encompass various alternatives, modifications and equivalents, as will be appreciated by those of skill in the art.

Figure 2:
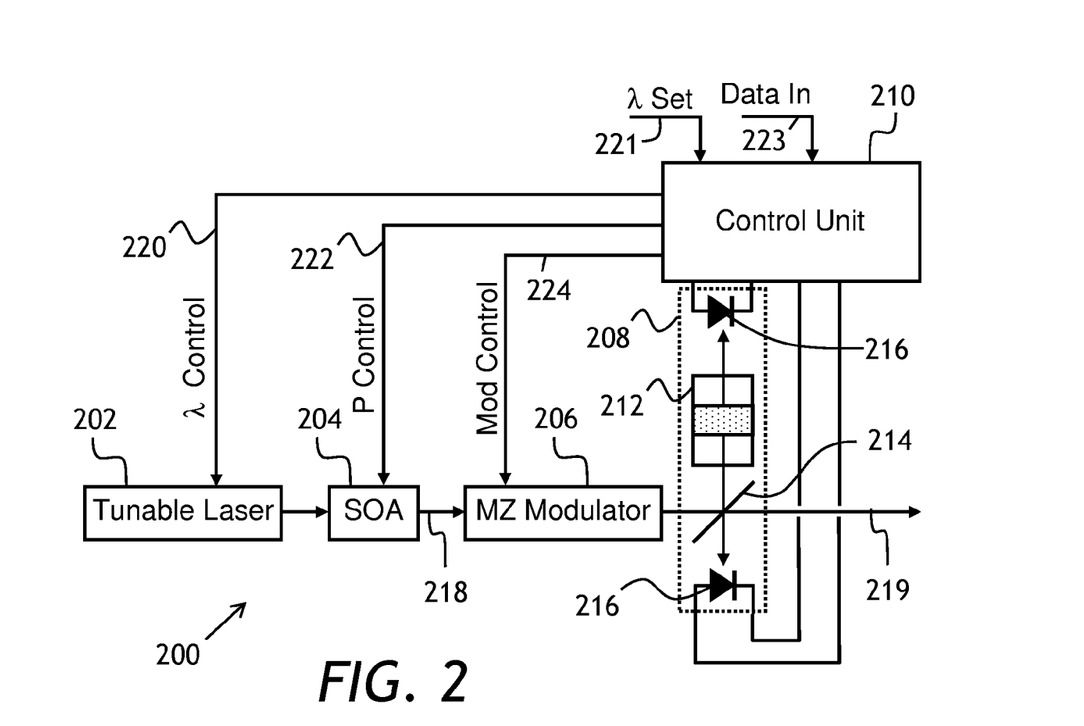
FIG. 2 is a block diagram of a tunable transmitter of the present invention.

Referring to FIG. 2, a tunable transmitter 200 includes a tunable laser 202, a semiconductor optical amplifier (SOA) 204, a Mach-Zehnder (MZ) modulator 206, a wavelength locker 208, and a control unit 210. The wavelength locker 208 has a Fabry-Perot interferometer or etalon 212, a beamsplitter 214, and two photodetectors 216, preferably photodiodes, for detecting an optical signal reflected from and transmitted through the Fabry-Perot interferometer 212. In operation, the control unit 210 provides a wavelength control signal 220 for tuning the wavelength of the tunable laser 202 to a wavelength set at a wavelength input 221, a power control signal 222 for adjusting gain of the semiconductor optical amplifier 204, and a modulation control signal 224 applied to the MZ modulator 206, for modulating an input optical beam 218 and controlling bias of the MZ modulator 206. The modulation control signal 224 includes an RF modulating signal inputted at a Data Input 223, superimposed with a bias control signal, for example a bias voltage, for adjusting a set point of the MZ modulator 206. It is to be understood that an optical modulator of a type other than MZ modulator can also be used in place of the MZ modulator 206.

The wavelength control signal 220 is generated so as to lessen the wavelength error signal proportional to a deviation of the wavelength of the tunable laser 202 from the wavelength set at the wavelength input 221. As will be appreciated by those skilled in the art, the reflection characteristic of the Fabry Perot interferometer 212 is selected so as to translate the deviation of the wavelength into a difference of photocurrents of the two photodetectors 216 of the wavelength locker 208.

The power control signal 222 is generated so as to set and maintain the optical power of an output beam 219 of the tunable transmitter 200 at a desired level. The measured output power is proportional to a sum of the photocurrents of the photodetectors 216. The bias of the MZ modulator 206 is controlled based on measurement of output optical power variation, which is derived from a variation of a sum of the photocurrents of the photodetectors 216. Thus, the photodetectors 216 are shared between the wavelength control, power control, and modulator control circuits of the control unit 210. Separate photodetectors can also be used, although the shared photodetectors 216 are preferred for cost reduction reasons.

Figure 3:
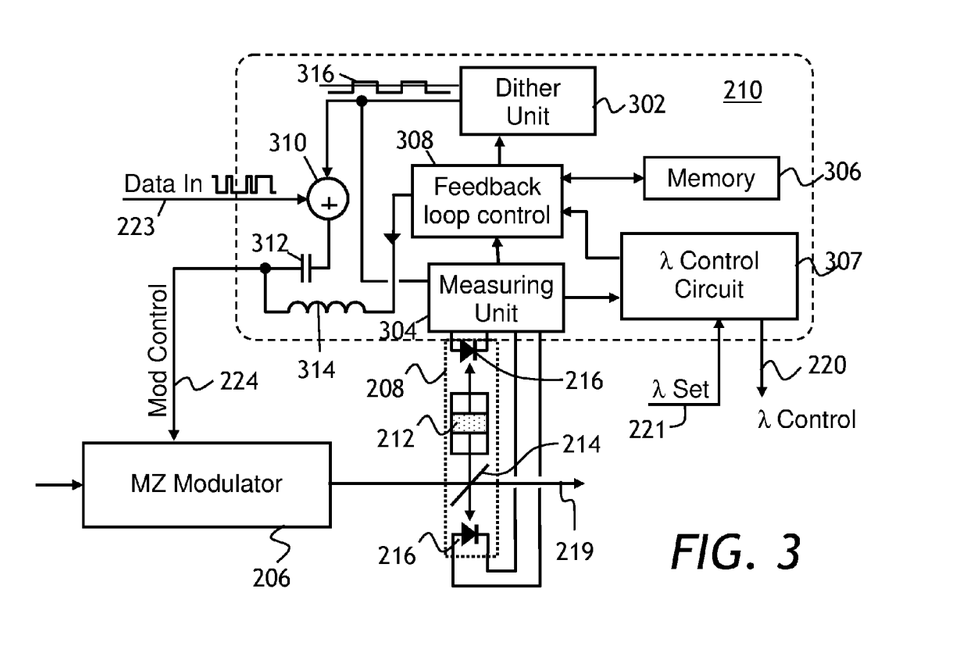
FIG. 3 is a block diagram of an optical modulator control system used in the tunable transmitter of FIG. 2.

The control unit 210 and its bias control function will now be described in more detail. Referring to FIG. 3, the control unit 210 includes a dither unit 302 for applying a dither signal 316 to the MZ modulator 206; a measuring unit 304 for measuring a peak-to-peak output optical power variation due to application of the dither signal 316 by the dither unit 302; a memory 306 for storing target peak-to-peak optical power variation values and bias signal values; and a feedback loop controller 308 for applying the bias control signal to the MZ modulator 206. A mixer 310, a capacitor 312, and an inductor 314 are used to combine an AC binary data signal from the Data Input 223 and a DC bias signal, for application to the MZ modulator 206. A wavelength control circuit 307 is used to provide the wavelength control signal 220 to the tunable laser 202 based on the difference of the photocurrents of the photodetectors 216, for tuning the tunable laser 202 to a wavelength set at the wavelength selection input 221.

In operation, the control unit 210 sets a wavelength of operation of the tunable laser 202 by applying the wavelength control signal 220 to the tunable laser 202 and an output optical power by applying the power control signal 222 to the SOA 204. Then, the control unit 210 causes the dithering unit 302 to generate the dithering signal 316, which is applied to the MZ modulator 206 via the mixer 310. The measuring unit 304 measures peak-to-peak output optical power variation due to the dithering, using the sum of the photocurrents of the photodetectors 216 as noted above. The feedback loop controller 308 adjusts the bias voltage applied to the MZ modulator 206, so as to lessen a difference between the peak-to-peak optical power variation measured by the measuring unit 304 and a target peak-to-peak optical power variation stored in the memory 306. The feedback loop controller 308 is preferably a first-order proportional integral-differential (PID) controller. The target peak-to-peak optical variation corresponds to the wavelength selected at the wavelength selection input 221. Each selectable wavelength has its own target peak-to-peak optical variation value stored in the memory 306. The target peak-to-peak optical variation values are determined during calibration.

Figure 4:
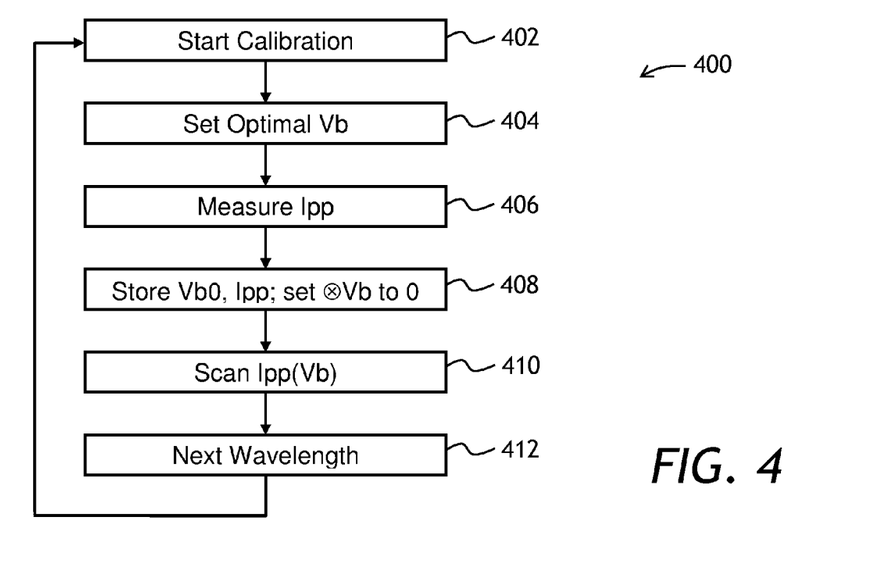
FIG. 4 is a flow chart of an optical modulator calibration method according to the invention.

The process of calibration of the MZ modulator 206 of the tunable transmitter 200 will now be described. Turning to FIG. 4, a method 400 of calibration the tunable transmitter 200 starts at a step 402, in which an optical signal at a wavelength λ1, a first bias signal, and a first RF modulating signal are applied to the MZ modulator 206. The optical signal is preferably generated by the tunable laser 202 and amplified by the SOA 204, forming the input optical beam 218. An external optical signal can also be used. After the signals are applied, a performance parameter, such as extinction ratio (ER) or transmit eye crossing point position, is measured. In a step 404, a magnitude of the first bias signal Vb is adjusted, so as to obtain a pre-determined value of the measured ER. When the desired performance is obtained, then in a step 406, a dither signal is applied to the MZ modulator 206, and a peak-to-peak output optical power variation, Ipp, caused by the dither signal application, is measured. The measured peak-to-peak optical power variation Ipp is used as a "target" value during subsequent operation of the device.

A ratio of amplitudes of the dither signal and the RF modulating signal can be adjusted during calibration, so as to obtain a predetermined value of the measured peak-to-peak optical power variation Ipp. Typically, the dither signal is 2.5% of the RF modulating signal, but the ratios of 2% to 8% can also be used. For example, if the RF modulating signal has an amplitude of 1V and the dither signal is 2.5%, the output modulating signal varies between 0.975V and 1.025V. The frequency of the dithering signal can be between 1 kHz and 20 kHz, preferably 2 kHz to 5 kHz, and most preferably 2.5 kHz. The data rate of the RF modulating signal can range widely, for example from 200 kHz to 40 GHz. A typical data rate is 10 GHz to 12 GHz.

The measured peak-to-peak output optical power variation Ipp is defined as follows:

$$I_{pp} \propto P(V_{RF}+V_D)-P(V_{RF}-V_D) \quad (1)$$

where P is instantaneous measured optical power, $V_{RF}$ is RF modulating signal amplitude, and $V_D$ is the dither signal amplitude.

Preferably, the measured peak-to-peak output optical power variation Ipp is averaged using a finite impulse response filter to reduce noise due to RF modulation. The finite impulse response filter can have a time constant of 0.25 to 0.5 seconds or larger.

In a step 408, the value of the bias signal, which can be a bias current or a bias voltage, is stored in the memory 306 along with the target optical power variation Ipp. In the embodiment described, the bias signal is a voltage Vb0. A value ΔVb, the use of which will become clear from the following description, is initially set to zero and stored in the memory 306. In an optional step 410, the peak-to-peak output optical power variation Ipp is measured as the bias voltage Vb is scanned. The measured dependence Ipp(Vb) can be used during operation of the MZ modulator 206 to set the bias of the MZ modulator 206. Using the dependence Ipp(Vb) for setting the bias of the MZ modulator 206 will be described in more detail below. Finally, in a step 412, a wavelength of the optical signal is tuned to a new value, and the steps 402 to 408, and optionally the step 410, are repeated.

Figure 5:
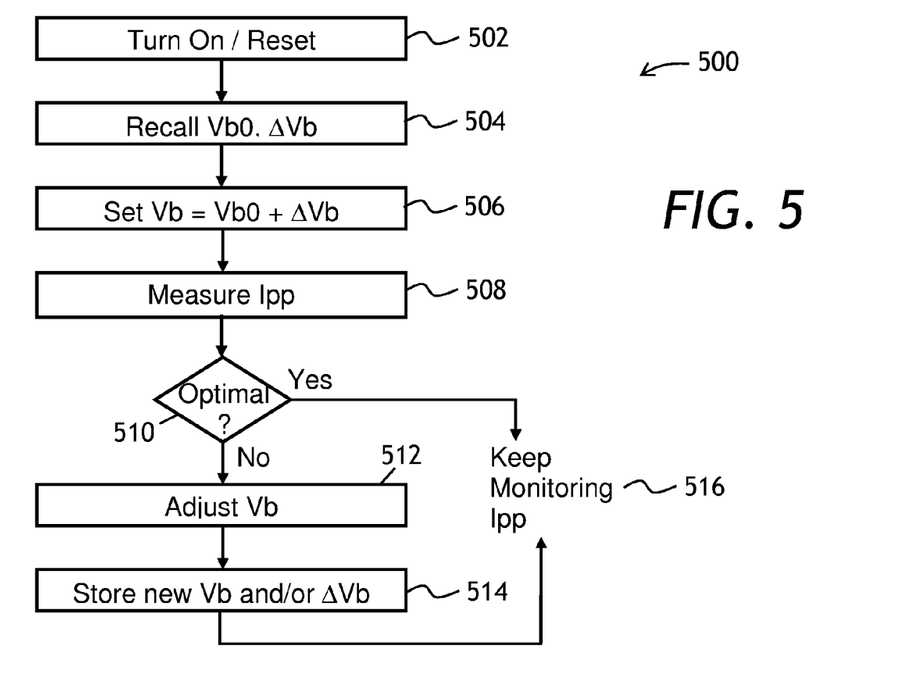
FIG. 5 is a flow chart of an optical modulator bias control method according to the invention.

Referring now to FIG. 5, a method 500 of operating the MZ modulator 206 of the tunable transmitter 200, calibrated using the method 400 described above, is presented. In a step 502, the MZ modulator 206 is turned on, or reset. In a step 504, the previously stored values Vb0 and ΔVb are recalled form the memory 306. In a step 506, a bias voltage Vb is set to Vb0+ΔVb and is applied to the MZ modulator 206. An optical signal at a wavelength λ1, an RF modulating signal, and the dither signal of the same amplitude as the amplitude used at calibration 400, are applied to the MZ modulator 206. In a step 508, a peak-to-peak optical power variation Ipp, caused by the dither signal application, is measured. In a step 510, the measured peak-to-peak optical power variation Ipp is compared to the "optimal" Ipp stored in the memory 306. If the measured peak-to-peak optical power variation Ipp is different from the "optimal" peak-to-peak optical power variation Ipp, then in a step 512, the feedback loop controller 308 adjusts the bias voltage Vb so as to lessen a difference between the measured and the "optimal" peak-to-peak optical power variation Ipp. In an optional step 514, the change of Vb, ΔVb, is stored in the memory 306 for subsequent use. Alternatively or in addition, the adjusted value of Vb can also be stored. In a step 516, the peak-to-peak optical power variation Ipp is monitored. If a deviation is detected, the process 500 repeats. Thus, the pre-determined value of the performance parameter used in calibration, such as ER, can be achieved without having to re-measure the performance parameter. The performance parameter of interest has been experimentally shown to remain at an optimal value during the lifetime of the optical modulator 200, without having to re-calibrate the optical transmitter 200.

Figure 6:
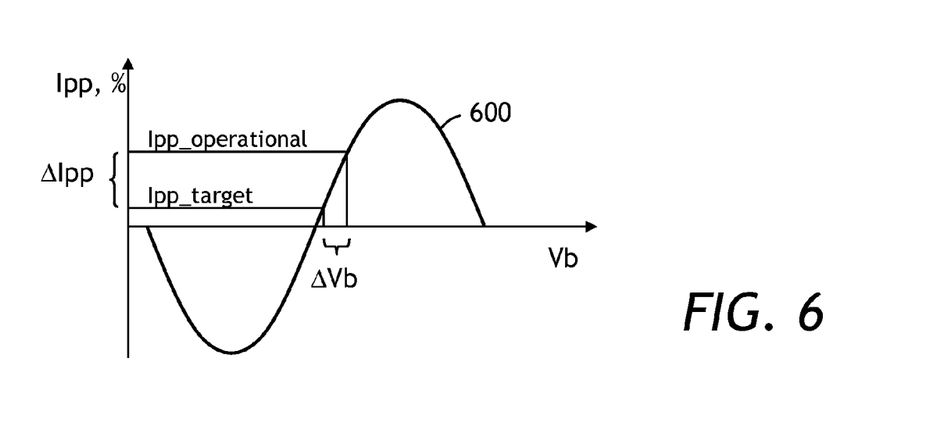
FIG. 6 is a graph of a dependence of a peak-to-peak optical modulation on a bias voltage applied to an optical modulator used in the tunable transmitter of FIG. 2.

The step 512 of adjusting the bias voltage Vb will now be considered in more detail. Referring to FIG. 6, a dependence 600 of a peak-to-peak optical modulation Ipp on the magnitude of the bias voltage Vb applied to the MZ modulator 206 is typically cyclical. The value of peak-to-peak optical power variation Ipp, measured in the step 508, is labeled in FIG. 6 as "Ipp_operational". Since the dependence 600 Ipp(Vb) has been previously measured in the step 410 of the calibration process 400, the adjustment ΔVb of the bias voltage Vb, required to bring the Ipp value to Ipp_target, can be easily calculated. Advantageously, this allows the adjustment of the bias voltage Vb to be performed much faster. Further, advantageously, the bias voltage Vb and/or the bias voltage adjustment ΔVb, stored in the memory 306 in the step 514, can be used next time the optical modulator 206 is restarted at the step 502 of the operating process 500, to speed up the bias adjustment.

It is to be understood that the methods 400 and 500 can also be used for controlling a single-wavelength optical modulator. In this case, the optical modulator only needs to be calibrated at one wavelength, and only one set of Vb and Ipp needs to be stored in the memory 306.

Figures 7, 8:
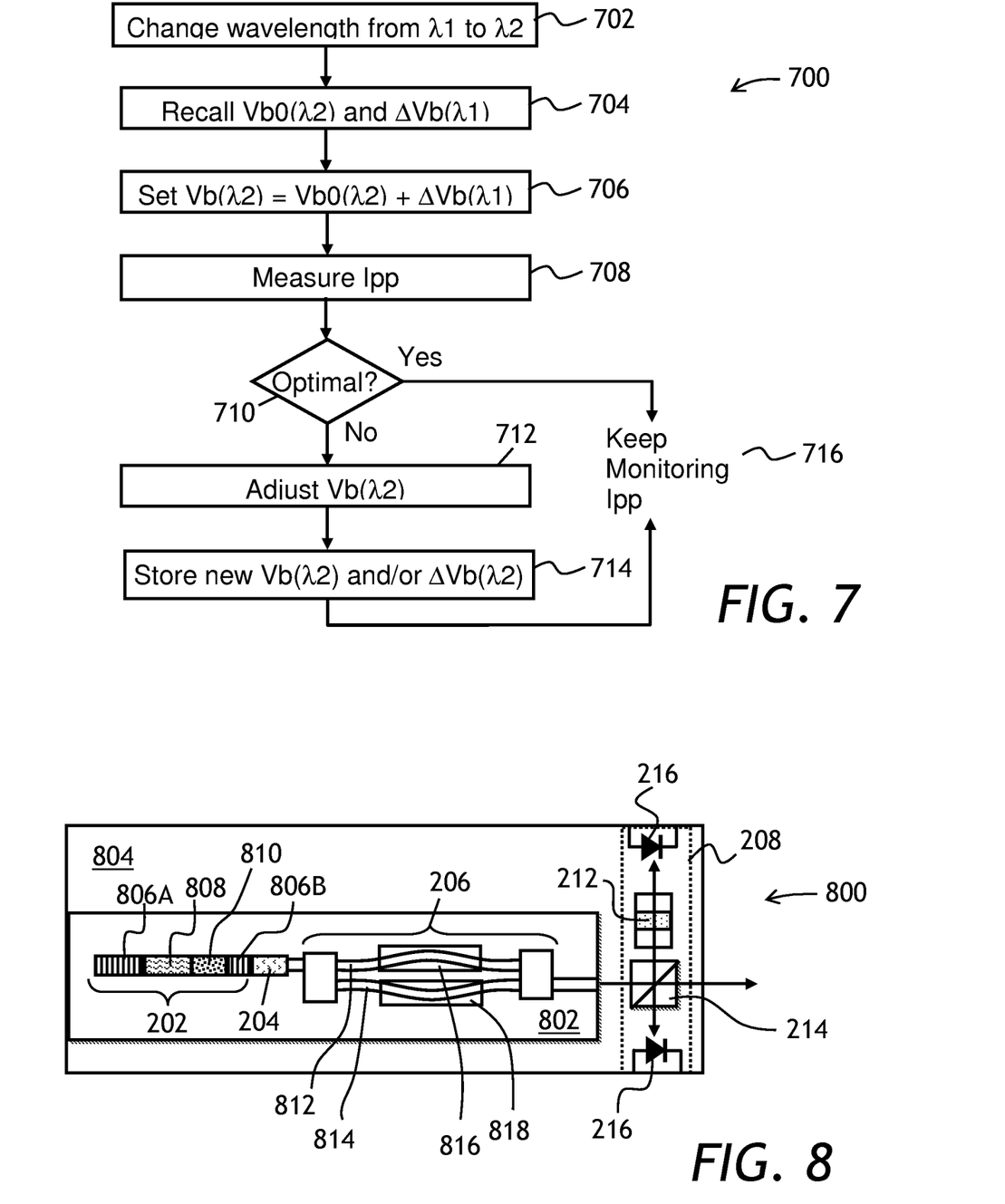
FIG. 7 is a flow chart of an optical modulator bias control method of the invention, used when a wavelength of the optical signal is changed.
FIG. 8 is a plan view of an optical subassembly of the tunable transmitter of FIG. 2.

Referring now to FIG. 7, a method 700 of operating the MZ modulator 206 of the tunable transmitter 200 is used when a wavelength of the tunable laser 202 is changed from one wavelength to another. It is assumed for certainty that the wavelength is changed from a "previous" wavelength λ1 to a "new" wavelength λ2. It is also assumed that the MZ modulator 206 has been calibrated using the method 400 described above, for both wavelengths λ1 and λ2. In a step 702, the wavelength of the tunable laser 202 is tuned from λ1 to λ2. In a step 704, the value Vb0 corresponding to the new wavelength λ2 is recalled form the memory 306. The value ΔVb, corresponding to the previous wavelength λ1, is also recalled at this step. In a step 706, a bias voltage Vb is set to Vb0+ΔVb and is applied to the MZ modulator 206. An RF modulating signal and the dither signal of the same amplitude as the amplitude used at calibration 400, are applied to the MZ modulator 206. In a step 708, a peak-to-peak optical power variation Ipp, caused by the dither signal application, is measured. In a step 710, the measured peak-to-peak optical power variation Ipp is compared to the "optimal" peak-to-peak optical power variation Ipp for the new wavelength λ2, stored in the memory 306 during calibration. If the measured peak-to-peak optical power variation Ipp is different from the "optimal" peak-to-peak optical power variation Ipp, then in a step 712, the feedback loop controller 308 adjusts the bias voltage Vb so as to lessen a difference between the measured and the "optimal" peak-to-peak optical power variation Ipp. In an optional step 714, the new value of Vb and/or the change of Vb, ΔVb, is stored in the memory 306 for subsequent use. In a step 716, the peak-to-peak optical power variation Ipp is monitored. If a deviation is detected, the process 700 repeats. In this way, the pre-determined value of the performance parameter used in calibration, such as ER, can be achieved without having to re-measure the performance parameter or re-calibrate the optical modulator 200.

Turning now to FIG. 8, an optical subassembly 800 of the tunable transmitter 200 includes a monolithically integrated semiconductor optical transmitter 802 and the wavelength locker 208 mounted on a common thermoelectric cooler (TEC) plate 804. The semiconductor optical transmitter 802 includes the tunable laser 202, the SOA 204, and the planar waveguide MZ modulator 206 monolithically integrated on a common semiconductor substrate. The tunable laser 202 has back and front mirror sections 806A and 806B, respectively, a phase section 808, and a gain section 810. The semiconductor optical transmitter 802 is described in detail in U.S. Pat. No. 7,633,988 by Fish et al., which is incorporated herein by reference. The MZ modulator 206 has left and right arms 812 and 814 having left and right electrodes 816 and 818, respectively, for adjusting optical phases of light propagating in the left and right arms 812 and 814, respectively.

Figure 9:
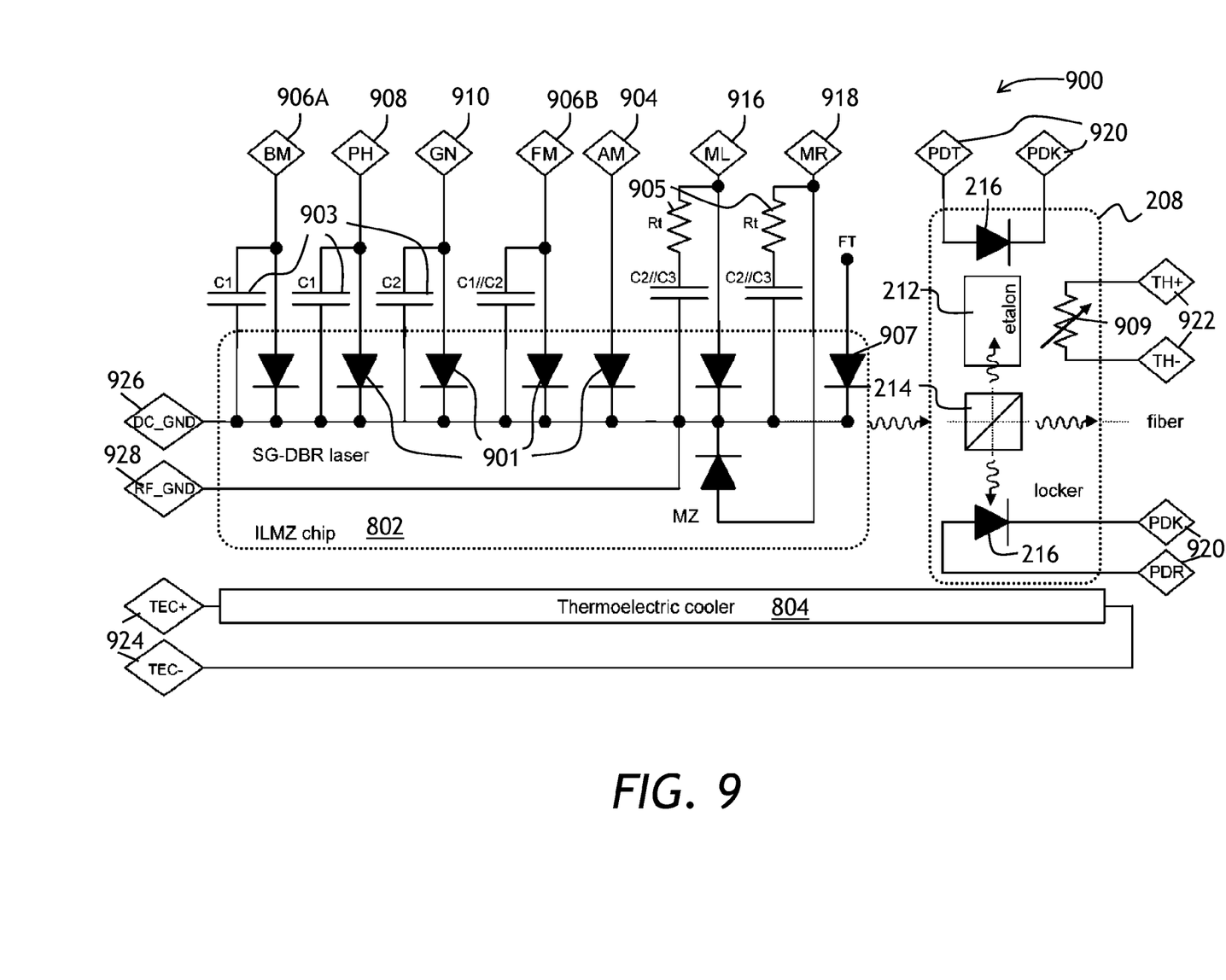
FIG. 9 is an equivalent electrical circuit of the subassembly of FIG. 8.

Referring to FIG. 9, an equivalent electrical circuit 900 of the optical subassembly 800 is shown. The monolithically integrated semiconductor optical transmitter 802 ("ILMZ chip" in FIG. 9) is represented by diodes 901, capacitors 903, and resistors 905. In operation, voltages are applied to a back minor electrode 906A, a phase section electrode 908, a gain section electrode 910, a front minor electrode 906B, a SOA electrode 904, to generate electrical currents and voltages required for operation of the tunable laser 202 ("SG-DBR laser" in FIG. 9) and the SOA 204. Modulation and bias voltages are applied to left and right arm electrodes 916 and 918, respectively, of the MZ modulator 206. A "DC_GND" electrode 926 is a ground electrode for the tunable laser 202 and SOA 204. A "RF_GND" electrode 928 is a ground electrode for the MZ modulator 206. An integrated photodiode 907 is also provided for monitoring output optical power, but not used in the embodiment shown. The TEC 804 has electrodes 924, and the photodiodes 216 have electrodes 920. Temperature of the TEC plate 804 is monitored by a thermistor 909 having electrodes 922.

Figure 10:
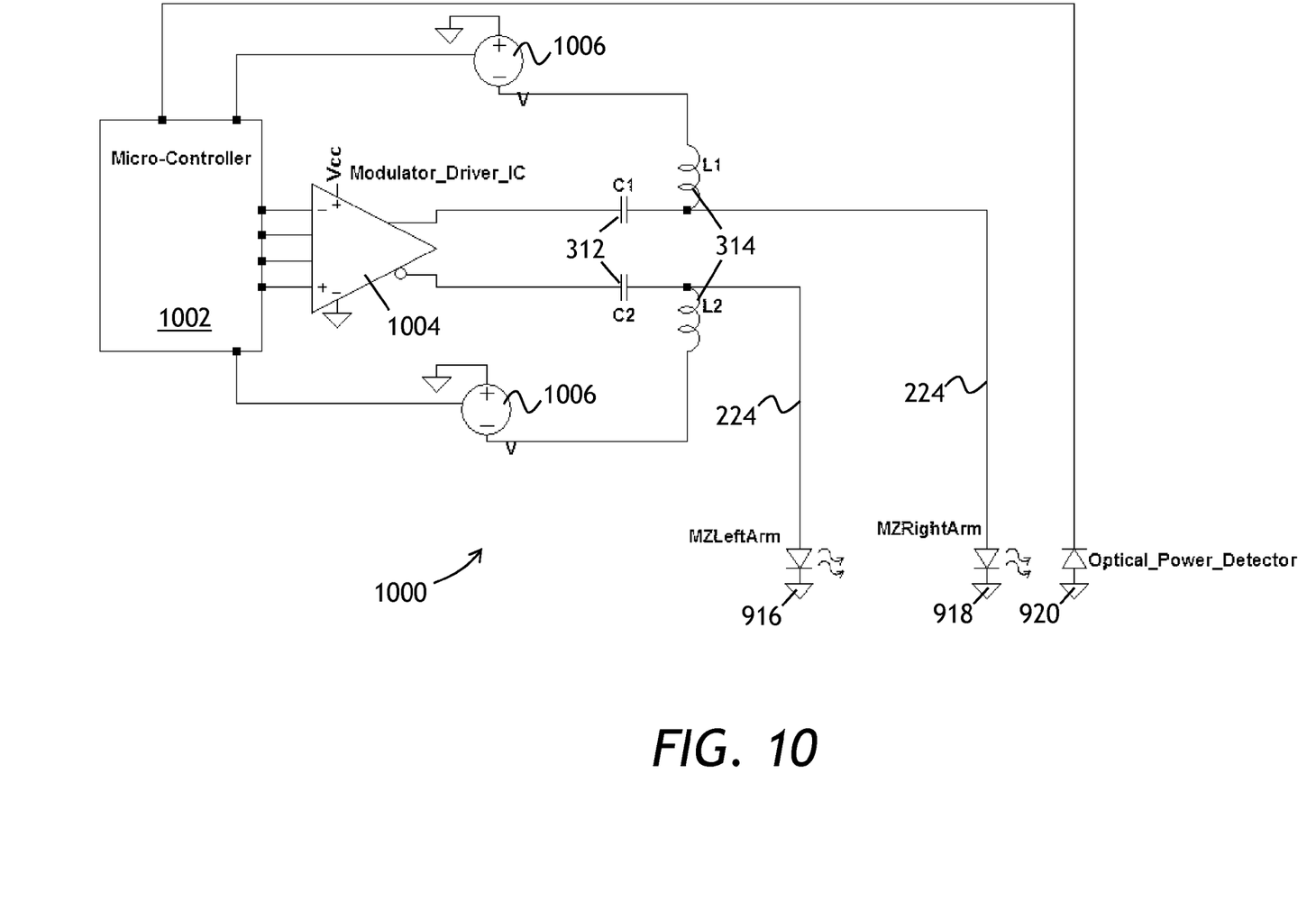
FIG. 10 is an electrical circuit of a driver for the subassembly of FIG. 8.

The control unit 210 of the tunable transmitter 200 is preferably microcontroller based, with the feedback loop controller 308 implemented in software or firmware. Turning to FIG. 10, an electrical circuit 1000 of a driver for driving the optical subassembly 800 is shown. A microcontroller 1002 is suitably programmed to control the MZ modulator 206 according to the calibration method 400 and the operation methods 500 and 700 described above. A modulator driver integrated circuit 1004 coupled to the micro-controller 1002 is used to provide the modulator control signals 224 to the left and right arm electrodes 916 and 918, respectively, of the MZ modulator 206, in counter-phase to each other. DC voltage generators 1006 are controlled by the microcontroller to provide the bias voltages Vb to the left and right arm electrodes 916 and 918, respectively, of the MZ modulator 206.

The foregoing description of one or more embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method for controlling an optical modulator, comprising:
(a) applying a first optical signal, a first bias signal, and a first RF modulating signal to the optical modulator and measuring a performance parameter thereof, wherein a magnitude of the first bias signal is selected so as to obtain a pre-determined value of the measured performance parameter;
(b) while applying the first optical signal, the first RF modulating signal, and the first bias signal of the magnitude selected in step (a) to the optical modulator, applying a dither signal to the optical modulator and measuring a target peak-to-peak optical power variation of the first optical signal due to the dither signal application;
(c) storing a magnitude of the first bias signal and the measured target peak-to-peak optical power variation in a memory;
(d) upon completion of steps (a) to (c), applying a second optical signal, a second RF modulating signal, a second bias signal, and the dither signal to the optical modulator, and measuring an operational peak-to-peak optical power variation of the second optical signal due to the dither signal application; and
(e) adjusting the second bias signal, so as to lessen a difference between the operational peak-to-peak optical power variation measured in step (d) and the target peak-to-peak optical power variation stored in step (c), thereby obtaining the pre-determined value of the performance parameter without having to re-measure the performance parameter, wherein steps (a) to (c) are performed during calibration of the optical modulator, and steps (d) and (e) are performed during subsequent operation of the optical modulator.

2. The method of claim 1, wherein a magnitude of the second bias signal applied in step (d) is equal to the magnitude of the first bias signal stored in step (c).

3. The method of claim 2, wherein the calibration of the optical modulator includes
(f) measuring a dependence of a peak-to-peak optical power variation of the first optical signal due to the dither signal application on a magnitude of the bias signal applied to the optical modulator,
wherein step (e) includes calculating, based on the operational peak-to-peak optical power variation measured in step (d) and the dependence measured in step (f), the adjustment of the second bias signal.

4. The method of claim 1, further including
(g) storing a magnitude of the second bias signal after the adjustment in step (e).

5. The method of claim 4, further including
(h) after completion of step (g), restarting the electro-optic modulator; and
(i) upon completion of step (h), repeating steps (d) and (e), wherein the repeated step (d) includes applying the second bias signal of the magnitude stored in step (g) to the optical modulator.

6. The method of claim 1, wherein the optical modulator is for operation at a plurality of wavelengths, the method further comprising repeating steps (a) and (b) while applying optical signals at each of the plurality of wavelengths, and storing in step (c) magnitudes of the first bias signal and the measured peak-to-peak optical power variations corresponding to each of the plurality of wavelengths,
wherein in step (d), the second optical signal is at a first one of the plurality of wavelengths, and in step (e), the target peak-to-peak optical power variation corresponds to the first wavelength.

7. The method of claim 6, further comprising
(j) upon completion of step (d), calculating a difference between the magnitudes of the first and the second bias signals, and storing the difference in the memory.

8. The method of claim 7, further comprising
(k) upon completion of step (j), changing wavelength of the second optical signal from the first wavelength to a second wavelength of the plurality of wavelengths;
(l) upon completion of step (k), repeating step (d) and (e), wherein in the repeated step (d), the second bias signal is a sum of the first bias signal at the second wavelength and the difference stored in step (j).

9. The method of claim 1, wherein step (b) includes adjusting a ratio of amplitudes of the dither signal and the RF modulating signal, to obtain a predetermined value of the target peak-to-peak optical power variation.

10. The method of claim 1, wherein the target peak-to-peak optical power variation of step (b) and the operational peak-to-peak optical power variation of steps (d) and (e) are averaged using a finite impulse response filter.

11. A control unit for controlling a multi-wavelength optical modulator, comprising:
a dither unit for applying a dither signal to the optical modulator;
a measuring unit for measuring a peak-to-peak optical power variation at an output of the optical modulator due to the dither signal application by the dither unit, when the optical signal is applied to an input of the optical modulator;
a memory for storing a target peak-to-peak optical power variation measured by the measuring unit for each of a plurality of wavelengths of the optical signal; and
a feedback loop controller operationally coupled to the memory, the dither unit, and the measuring unit, for applying a bias signal to the optical modulator, in dependence upon a wavelength of the optical signal applied to the optical modulator input, so as to lessen a difference between the peak-to-peak optical power variation measured by the measuring unit and one of the target peak-to-peak optical power variations stored in the memory, corresponding to the wavelength of the optical signal applied.

12. The control unit of claim 11, wherein the feedback loop controller comprises a suitably programmed microcontroller.

13. The control unit of claim 11, wherein the feedback loop controller comprises a PID controller.

14. A tunable transmitter comprising:
the control unit of claim 11;
a tunable laser source for providing the optical signal;
a multi-wavelength optical modulator coupled to the tunable laser source, controlled by the control unit; and
a wavelength locker coupled to the control unit, for locking a wavelength of the tunable laser source to any of the plurality of wavelengths;
wherein the control unit is adapted to provide a wavelength control signal for tuning the wavelength of the tunable laser source to a first one of the plurality of wavelengths, using the wavelength locker to generate a wavelength error signal proportional to a deviation of the wavelength of the tunable laser source from the first wavelength, and to adjust a bias signal applied to the multi-wavelength optical modulator, so as to lessen a difference between the peak-to-peak optical power variation measured by the measuring unit and a target peak-to-peak optical power variation stored in the memory, corresponding to the first wavelength.

15. The tunable transmitter of claim 14, wherein the wavelength locker comprises a Fabry-Perot interferometer and first and second photodetectors for detecting an optical signal reflected from and a transmitted through the Fabry-Perot interferometer,
wherein the wavelength error signal is proportional to a difference of photocurrents of the first and the second photodetectors, and
wherein the peak-to-peak optical power variation is proportional to a peak-to-peak variation of a sum of the photocurrents of the first and the second photodetectors.

16. The tunable transmitter of claim 15, wherein the multi-wavelength optical modulator comprises a planar waveguide Mach-Zehnder modulator integrated with the tunable laser source on a common substrate.

17. The tunable transmitter of claim 16, wherein the tunable laser source includes a semiconductor optical amplifier coupled to the planar waveguide Mach-Zehnder modulator, wherein the control unit is adapted to adjust an output optical power of the tunable transmitter by adjusting gain of the semiconductor optical amplifier, using the sum of the photocurrents of the first and the second photodetectors as a measure of the output optical power.

18. The tunable transmitter of claim 16, wherein the planar waveguide Mach-Zehnder modulator has two arms each having an electrode for adjusting an optical phase of an optical signal propagating therein.

19. The tunable transmitter of claim 18, wherein the control unit comprises a modulator driver unit electrically coupled to both electrodes for adjusting the optical phase in both arms of the planar waveguide Mach-Zehnder modulator.

20. The tunable transmitter of claim 19, wherein the dither unit is electrically coupled to the optical modulator driver unit for applying the dithering signal to both electrodes of the planar waveguide Mach-Zehnder modulator.

* * * * *

UNITED STATES PATENT AND TRADEMARK OFFICE
CERTIFICATE OF CORRECTION

PATENT NO.         : 8,543,010 B2
APPLICATION NO.    : 13/033502
DATED              : September 24, 2013
INVENTOR(S)        : Zhou et al.

It is certified that error appears in the above-identified patent and that said Letters Patent is hereby corrected as shown below:

In the Specification

Column 7, line 62, "minor electrode 906A,"
  should read    --mirror electrode 906A,--

Column 7, line 63, "a front minor electrode 906B"
  should read    --a front mirror electrode 906B--

Signed and Sealed this
Twenty-ninth Day of July, 2014

Michelle K. Lee
*Deputy Director of the United States Patent and Trademark Office*